United States Patent Office 3,335,205
Patented Aug. 8, 1967

3,335,205
PHOSPHONATE PURIFICATION PROCESS
Clarence W. Huffman, Glenview, Ill., assignor to International Minerals & Chemical Corporation, a corporation of New York
No Drawing. Filed May 27, 1964, Ser. No. 370,660
3 Claims. (Cl. 260—990)

This invention relates to a process for the purification of organic phosphonates. In a more specific aspect, this invention relates to a process for the purification of alkyl phosphonate diesters contaminated with halogen-containing impurities. In a preferred aspect this invention relates to a method for removing chlorine from a monoalkyl phosphonic acid diester containing as a contaminant corresponding chloromonoalkyl phosphonic acid diester.

The use of organic phosphorus compounds, such as tricresyl phosphate, or alkyl phosphonates such as decyl dicresyl phosphonate, as plasticizers for polymeric films and resins is well known. It is also known that materials useful as plasticizers should be free from halogen contamination since this halogen has a strong tendency to cause discoloration or yellowing in the plasticized polymer. This problem is especially important when the plasticized polymer is white or clear.

In co-pending application, Serial No. 223,511, filed September 13, 1962 by Huffman et al., entitled Process for the Production of Monoalkyl Phosphonic Acid Diesters, Diamides and Dihalides, now U.S. Patent 3,149,144, granted September 15, 1964 there is described a new and improved process for the production of monoalkyl phosphonic acid diesters which involves as an intermediate step halogenation of an intermediate monoalkyl halophosphine to raise the valence of the phosphorus therein from the trivalent to the pentavalent stage. Although great care is usually exercised in this halogenation procedure, as for example, by controlled addition of halogen at low temperatures, it has been difficult, if not impossible, to prevent some halogen from reacting with a carbon atom in the alkyl group of the monoalkyl halophosphine intermediate as well as with the phosphorus therein. This undesirable halogenation usually occurs on the carbon atom alpha to the phosphorus atom since this carbon atom is the most reactive. The undesirable halogenated compound follows through the process as a whole and is usually present in the final monoalkyl phosphonic acid diester product as the corresponding halomonoalkyl phosphonic acid diester. Because of the close boiling points between the desired compound and its halo analogue, it has been impossible to effectively separate the two by distillation procedures. Further, numerous well-known chemical methods for the removal of halogen proved ineffective. Thus, for example, the use of such materials as sodium acetate, epoxides, lead oxide, lead tetraacetate, potassium borohydride, sodium methoxide and magnesium amalgam were all ineffective.

In accordance with the present invention I have discovered that monoalkyl phosphonic acid diesters contaminated with corresponding chloromonoalkyl phosphonic acid diesters can be substantially dehalogenated and made suitable for use as plasticizers by treatment with phosphite triesters, as more particularly described hereinafter. While phosphites have been used directly as antioxidants and stabilizers for polymeric resins, it was not at all apparent that these materials would be effective for the purpose herein intended, especially since one of the most reactive commercial phosphite triesters, triethyl phosphite, proved ineffective.

It is, therefore, an object of the present invention to provide a process for the purification of alkyl phosphonate diesters contaminated with halogen-containing impurities.

It is a further object of this invention to provide a method for removing halogen from a monoalkyl phosphonic acid diester containing as a contaminant corresponding halomonoalkyl phosphonic acid diester.

It is a specific object of the present invention to provide a method for removing chlorine from monoalkyl dicresyl phosphonate containing as a contaminant chloromonoalkyl dicresyl phosphonate.

Additional objects of the present invention will be apparent from the description which follows.

In general, the present invention is concerned with a process for the substantial removal of a halogen selected from group Cl, Br and I from an alkyl phosphonate diester containing as a contaminant corresponding haloalkyl phosphonate diester which involves treating the contaminated alkyl phosphonate diester in the liquid phase, preferably at atmospheric pressure, at a temperature of at least 200° C. for a period of from about 1 to about 10 hours, with at least a stoichiometric amount, based upon contaminant, of a phosphite triester having a boiling point higher than the temperature at which treatment is effected. During said treatment there is distilled from the reaction mixture a halogen-containing compound that boils under the ambient conditions of the treatment.

It is believed, although applicant does not want to be bound by the theory, that the chemistry of his process proceeds according to the equation

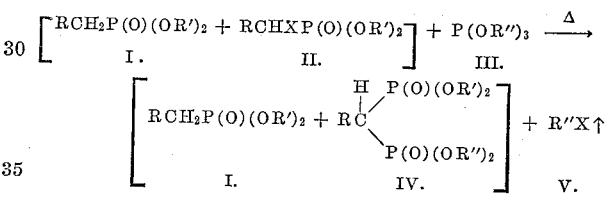

In the above equation the formula designated I. represents the monoalkyl phosphonate diesters which are to be purified and which may be prepared as described in co-pending application Serial No. 223,511 referred to hereinbefore. The formula designated II represents the contaminant, or corresponding halomonoalkyl phosphonate diester. Thus, I and II represent the mixture treated in accordance with the process of the present invention. The formula designated III represents the phosphite triester which reacts with the halogen-containing contaminant in what is believed to be an Arbuzov-type reaction. The selection of the appropriate phosphite triester is an important feature of the present process, as will be explained more fully. Formula IV represents one of the products resulting from the reaction between II and III and can be classed generally as an alkyl bisphosphonate diester. If desired, this product can be separated from I by distillation or the like. However, IV is also a phosphonate and it can be retained in admixture with I for use as a plasticizer, since the deleterious halogen has been removed. Formula V represents the organic halide by-product resulting from the reaction between II and III. Product V preferably should be removed by volatilization from the reaction mixture as it forms. If V is an alkyl halide, it, too, would react with the phosphite triester in an Arbuzov reaction, and, thus, interfere with the desired reaction. If V is an aromatic halide, it will not undergo the Arbuzov reaction and need not be removed as it forms. However, it must eventually be removed from the product by volatilization.

In Formulas I, II and IV, R is an alkyl hydrocarbon radical having from 1 to 23 carbon atoms. Examples of the alkyl radicals include ethyl, propyl, butyl, pentyl, hexyl, heptyl, octyl, nonyl, decyl, undecyl, dodecyl, tridecyl, tetradecyl, hexadecyl, octadecyl and eicosyl. It will be appreciated, of course, that the alkyl phosphonate diester may be a mixture wherein R may be of varying lengths since, as pointed out in the co-pending application, Serial No. 223,511, this portion of the molecule comes from the alkyl groups contained in trialkyl aluminum which may be the same or different. X in Formulas II and V is a halide selected from the group consisting of chlorine, bromine and iodine. The preferred and most common halide is chlorine. R' in Formulas I, II and IV is an organic radical selected from the group consisting of aliphatic hydrocarbon, cycloaliphatic hydrocarbon, aromatic hydrocarbon, mixed aliphatic-aromatic hydrocarbon such as alkaryl and aralkyl groups and alkyl oxyalkylene. The above hydrocarbon radicals may be saturated or unsaturated and substituted or unsubstituted, but when substituted they must be substituted with inert functional groups, that is, those groups which will not interfere with the reaction between the halogen impurity and the phosphite triester. Illustrative examples of R' groups include methyl, ethyl, propyl, isopropyl, butyl, amyl, hexyl, octyl, dodecyl, hexadecyl, octadecyl, and the like; olefinic and acetylenic analogues of the foregoing; cyclohexyl, cyclopentyl, methylcyclohexyl, phenyl, methylphenyl, ethylphenyl, naphthyl, methylnaphthyl, ethylnaphthyl, tolyl, xylyl, methoxyethyl, ethoxyethyl, methylpolyoxyethyl, methoxypropyl, ethylpolyoxypropyl, and the like. Typical products represented by Formula I include ethyl dicresyl phosphonate, octyl dicresyl phosphonate, ethyl dioctyl phosphonate, octyl diphenyl phosphonate, pentyl dibutyl phosphonate and the like. Obviously, from the preceding description, Formula II represents corresponding compounds having a halogen attached to the carbon atom alpha to the phosphorus atom in the phosphonate diester.

Formula III represents the phosphite triester employed in the process of the present invention. As mentioned earlier herein, this phosphite triester must be carefully chosen. That is, it must have a boiling point higher than about 200° C. and above the temperature at which the process is employed. Further, it must contribute a radical, R'', which when combined with the halide, X, results in a product which boils below the temperature at which the process is carried out. Thus, in the formula P(OR'')$_3$, R'' is an organic radical selected from the group consisting of aliphatic hydrocarbon, cycloaliphatic hydrocarbon and aromatic hydrocarbon. All of the R'' may be different or alike, but in any event, the triphosphite ester must meet the two major criteria set forth above. The preferred phosphite triester is triphenyl phosphite. Typical phosphites which may be employed include trioctyl phosphite, tricresyl phosphite, octyldicresyl phosphite, ethyldiphenyl phosphite, ethyldicresyl phosphite, octylnonyldecyl phosphite, diphenylcresyl phosphite, ethyldinaphthyl phosphite, octyldicyclohexyl phosphite, and the like. Phosphite esters are, in general, prepared by treating hydroxyl-containing organic compounds such as alcohols, phenols, etc., with phosphorus trihalides such as PCl$_3$, PBr$_3$ and PI$_3$. Given the foregoing criteria, the choice of a proper phosphite triester for the present process is within the skill of an ordinary chemist. Triphenyl phosphite is preferred because of its ready availability and the fact that the chlorobenzene which forms, will not undergo the Arbuzov reaction.

In carrying out the process of the present invention, solvents may be employed, but they are generally not preferred since they tend to diminish the reaction rate by the dilution factor involved. However, if solvents are employed, they should be high boiling, viz, boil in excess of 200° C. and be inert in the environment.

The process of the present invention is preferably carried out at atmospheric pressure, although higher or lower pressure may be employed provided the reactants are kept in the liquid phase and the temperature is maintained above about 200° C. and may go as high as the boiling point of the lowest boiling reactant. The process may be carried out over a period of about 1 to about 10 hours. It will be appreciated that the nature of the material being treated and the choice of reactants will have a bearing, within the limits above prescribed, on the conditions to be employed in carrying out the process.

In a preferred embodiment of the present invention, an alkyl phosphonate diester containing as a contaminant an amount, up to about 40% by weight, preferably between about 5 and about 10% by weight of corresponding haloalkyl phosphoate diester is admixed with at least a stoichiometric amount, based upon the amount of contaminant of a phosphite triester having a boiling point of at least about 200° C. Typically, the alkyl phosphonate diester can be octyldicresyl phosphonate containing chlorooctyldicresyl phosphonate as a contaminant and the phosphite triester can be triphenyl phosphite. The mixture is maintained in the liquid phase at atmospheric pressure and at a temperature of at least 200° C., preferably about 285° C., but below the boiling point of the triphenyl phosphite and the octyldicresyl phosphonate for a period of about 1 to 10 hours. During said time chlorobenzene is continuously distilled from said reaction mixture. Generally when no further chlorobenzene comes off, the reaction is substantially complete.

The following examples will help illustrate the underlying principles of the present invention.

EXAMPLE I

Preparation of alkyl phosphonate diester

Mixed alkyl trialkylaluminum, 69% solution in a hydrocarbon solvent, 332.0 g. (0.47 mole), dissolved in 150 ml. of ethylene dichloride, was added to a solution of phosphorus trichloride, 230.8 g. (1.68 moles), in 500 ml. of ethylene dichloride in a three liter flask. The addition was carried out over a one-hour period at 35 to 45° C. under nitrogen. The reactants were heated an additional one hour at the same temperature and the clear, pale-yellow solution cooled by means of a Dry Ice-acetone bath to −5° C. The theoretical quantity of chlorine, 119 g. (1.68 moles) was bubbled in at 0 to −5° C. at 210 ml. per minute (5.0 units, Flowrator 02F–1/8–12–5/36) for 180 minutes with the hood light off. The cold bath was removed and isopropanol, 85.8 g. (1.43 moles), was added in 15 minutes, during which time the temperature gradually rose to 30° C. and hydrogen chloride evolved. The mixture was then heated at 35–45° C. for ½ hour. Jefferson Lake Sulfur Company Cresols No. 23, 469.0 g. (4.28 moles, 20% excess), were added in 20 minutes at 40 to 50° C. and the solution was then heated at reflux for 5 hours. The clear, straw liquid was washed twice with 500 ml. water portions, keeping the temperature below 25° C. This was followed by first washing with 500 ml. of 5% sodium hydroxide solution, and then with 500 ml. of 5% potassium hydroxide in 50% aqueous ethanol. The organic layer was then washed with 500 ml. water portions until neutral (3 times). The ethylene dichloride was removed by vacuum stripping under water-aspirator vacuum to 100° C. at 37 mm., leaving 581 g. of pale yellow residue.

The trialkylaluminum hydrocarbon solvent plus some residual xylenol were distilled off by heating to 168° C. under vacuum in a one-liter flask having a capillary nitrogen ebullator. The distillate was collected from 44° C. (1.0 mm.) to 82° C. (0.6 mm.). It weighed 78.0 g. (theoretical weight of AlR$_3$ solvent is 103 g.) and had a cresolic odor. The cold trap condensate weighed 8.2 g. (total condensate 86 g.). The residual crude product was a hazy, straw oil, weighing 494.3 g. (84% yield). It contained 0.7% chlorine.

Purification of alkyl phosphonate diester

The remainder of the crude product 478.8 g., was treated with triphenyl phosphite, 31.4 g. (0.10 mole, 10% excess based on chlorine content), at 275–285° C. for 3 hours, with nitrogen bubbling through the solution. During this time, 14.1 g. of material distilled over, at a maximum vapor temperature of 165° C. The distillate (which should be mainly chlorobenzene, b. 132° C.) was collected in two fractions, both having a "phosphonite" odor and giving positive Beilstein tests for chlorine; 1st cut: $n_D^{26}$ 1.5209; 2nd cut: $n_D^{26}$ 1.5193. The residual treated product contained 0.1% chlorine. The very hazy, orange dechlorinated product, 479 g., was distilled in a molecular still (Rodney Hunt Vacu-Film Processor) at 190–205° C. at 15–19 μ. The very pale yellow distillate weighed 436.1 g. (76% yield). Analysis: Chlorine, 0.1%; acid No. 1.3. The product was dissolved in 500 ml. of benzene and re-washed with 200 ml. of 5% potassium hydroxide in 50% aqueous ethanol. After washing with water until neutral and vacuum stripping, the acidity of the material was determined. Analysis: Acid No. 0.25.

EXAMPLE II

An alkyl phosphonate diester prepared as described in the first portion of Example I was treated with triethyl phosphite at a temperature of about 150° C. without substantial reduction of the chlorine content.

EXAMPLE III

Dicresyl alkyl phosphonates prepared as described in the first portion of Example I were treated by various conventional methods for the removal of chlorine as well as the method in the present invention. The results of said tests are set forth in Table III.

TABLE III
[Dichlorination of dicresyl alkylphosphonates]

| Treatment | | | Percent Chlorine | |
|---|---|---|---|---|
| Reagent | Temp., °C. | Time, hrs. | Initial | Final |
| Steam | 100 | 0.5 | 0.7 | 0.7 |
| Sodium acetate | 170 | 1 | 0.7 | 0.7 |
| Admex 710 | 140 | 1 | 0.7 | 0.7 |
| Lead Oxide | 85 | 1 | 0.7 | 0.7 |
| Do | 170 | 1 | 0 8 | 0.4 |
| Lead Tetraacetate | 85 | 1 | 0.7 | 0.7 |
| Potassium Borohydride | 40 | 1 | 0.5 | 0.5 |
| Sodium Methoxide | 65 | 4 | 0.5 | 0.5 |
| Magnesium Amalgam | 35 | 8 | 1.2 | 1.2 |
| Triphenyl Phosphite | 280 | 2 | 0.7 | 0.2 |
| Do | 280 | 3 | 0.7 | 0.1 |
| Triethyl Phosphite | 150 | 2 | 0.6 | 0.5 |

While this invention has been described and exemplified in terms of a preferred embodiment, those skilled in the art will readily appreciate that variations can be made without departing from the spirit and scope of the invention.

The embodiments of the invention in which an exclusive property or privilege is claimed are defined as follows:

1. A process for the substantial removal of a halogen selected from the group consisting of chlorine, bromine and iodine from an alkyl phosphonate diester containing as a contaminant corresponding haloalkyl phosphonate diester which comprises treating the contaminated mixture at a temperature of a least about 200° C. while maintaining said mixture in the liquid phase for a period of from about 1 to about 10 hours with at least a stoichiometric amount, based upon the amount of contaminant, of a phosphite triester having a boiling point higher than the temperature at which said treatment is effected; and distilling from said reaction mixture during said treatment a halogen-containing compound having a boiling point lower than the boiling point of said alkyl phosphonate diester and said phosphite triester.

2. A process for the substantial removal of a halogen selected from the group consisting of chlorine, bromine and iodine from an alkyl phosphonate diester containing as a contaminant up to about 40% by weight of a corresponding haloalkyl phosphonate diester which comprises admixing with said contaminated mixture at least a stoichiometric amount, based upon the quantity of contaminant, of a phosphite triester having a boiling point of at least 200° C.; maintaining the resulting mixture in the liquid phase at atmospheric pressure and at a temperature of at least 200° C. but below the boiling point of said phosphite triester and said alkyl phosphonate diester for a period of from about 1 to about 10 hours; and distilling from said reaction mixture during said period a halogen-containing compound having a boiling point below the ambient temperature of said reaction mixture.

3. A process for the substantial removal of chlorine from a mixed monoalkyl dicresyl phosphonate containing as a contaminant about 10% by weight of corresponding haloalkyl dicresyl phosphonate which comprises admixing with said mixture at least a stoichiometric amount, based upon the amount of haloalkyl dicresyl phosphonnate, of triphenyl phosphite; maintaining the resulting mixture in the liquid phase at atmospheric pressure at a temperature of about 280° C. for a period of about 4 hours; and distilling from said reaction mixture during said period, chlorobenzene.

No references cited.

CHARLES B. PARKER, *Primary Examiner.*

A. SUTTO, *Assistant Examiner.*